United States Patent [19]

Füwesi

[11] Patent Number: 4,550,235

[45] Date of Patent: Oct. 29, 1985

[54] APPARATUS FOR RESTORING THE SURFACES SURROUNDING THE BORES OF METALLIC WORKPIECES

[76] Inventor: Peter Füwesi, Mosbacher Str. 13, D-6951 Schefflenz-U., Fed. Rep. of Germany

[21] Appl. No.: 517,347

[22] Filed: Jul. 26, 1983

[30] Foreign Application Priority Data

Jul. 30, 1982 [DE] Fed. Rep. of Germany ....... 3228470

[51] Int. Cl.$^4$ .............................................. B23K 9/04
[52] U.S. Cl. .............................. 219/76.14; 219/76.12; 219/76.1; 228/45
[58] Field of Search .................. 219/76.1, 76.11, 76.12, 219/76.14, 76.15, 60 A, 66; 228/119, 45

[56] References Cited

U.S. PATENT DOCUMENTS

| | | | |
|---|---|---|---|
| 3,945,752 | 3/1976 | Bennett | 408/146 |
| 4,063,842 | 12/1977 | Barkley et al. | 408/146 |
| 4,068,791 | 1/1978 | Scholtus et al. | 219/60 A X |
| 4,215,809 | 8/1980 | Davis | 219/76.14 X |
| 4,290,239 | 9/1981 | Zimmer | 228/45 X |

FOREIGN PATENT DOCUMENTS 637227 12/1978 U.S.S.R. ............................. 228/119

Primary Examiner—Roy N. Envall, Jr.
Assistant Examiner—Catherine M. Sigda
Attorney, Agent, or Firm—Peter K. Kontler

[57] ABSTRACT

An apparatus for restoring the surfaces surrounding blind or through bores of metallic workpieces has a housing for an axially movable shaft which can be placed into axial alignment with the bore of a workpiece, a spindle which is rotatable in and is movable axially with the shaft, and several tool carriers each of which can be removably connected with the front end portion of the spindle. At least one of the carriers supports a welding nozzle which is surrounded by a nozzle for discharge of a protective gas and can be used to deposit fillets of molten welding wire along the surface or surfaces surrounding the bore. Another carrier supports a material removing tool which is used to remove the surplus of the fillet, and a third carrier is used when the restored surface is to be provided with a thread. The third carrier supports a thread cutting tool.

20 Claims, 14 Drawing Figures

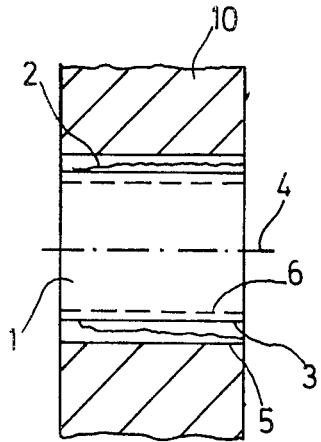
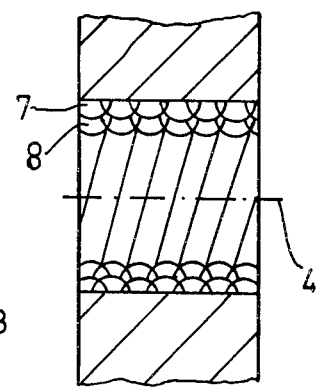
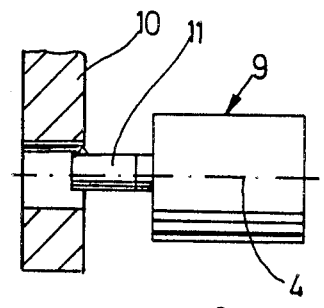
Fig. 1  Fig. 2  Fig. 3
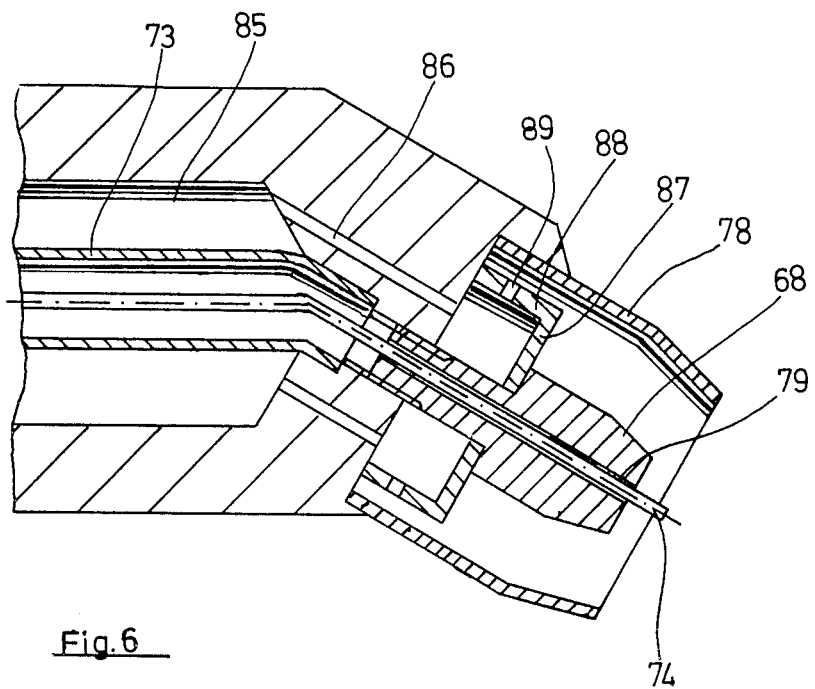
Fig. 6

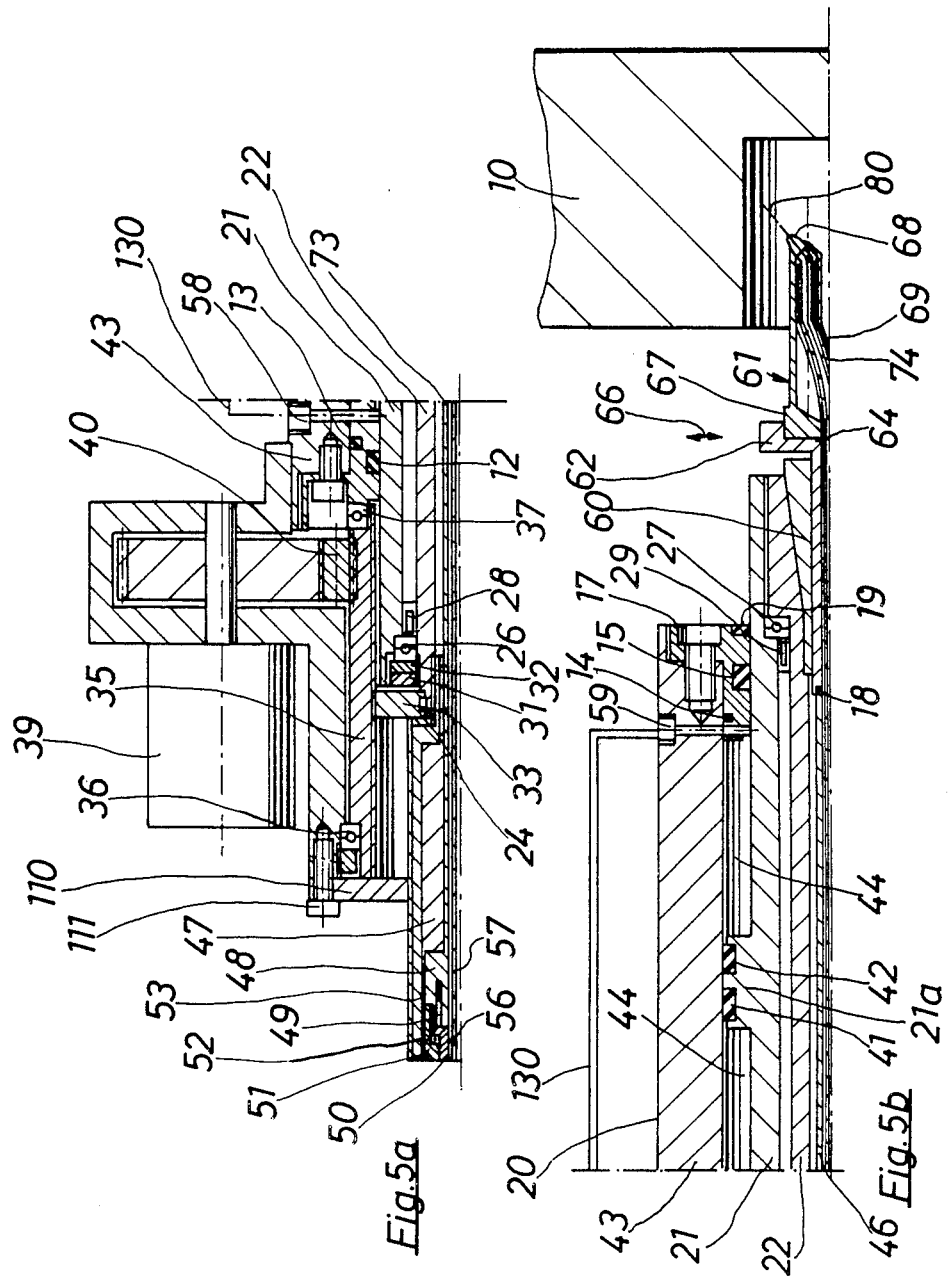

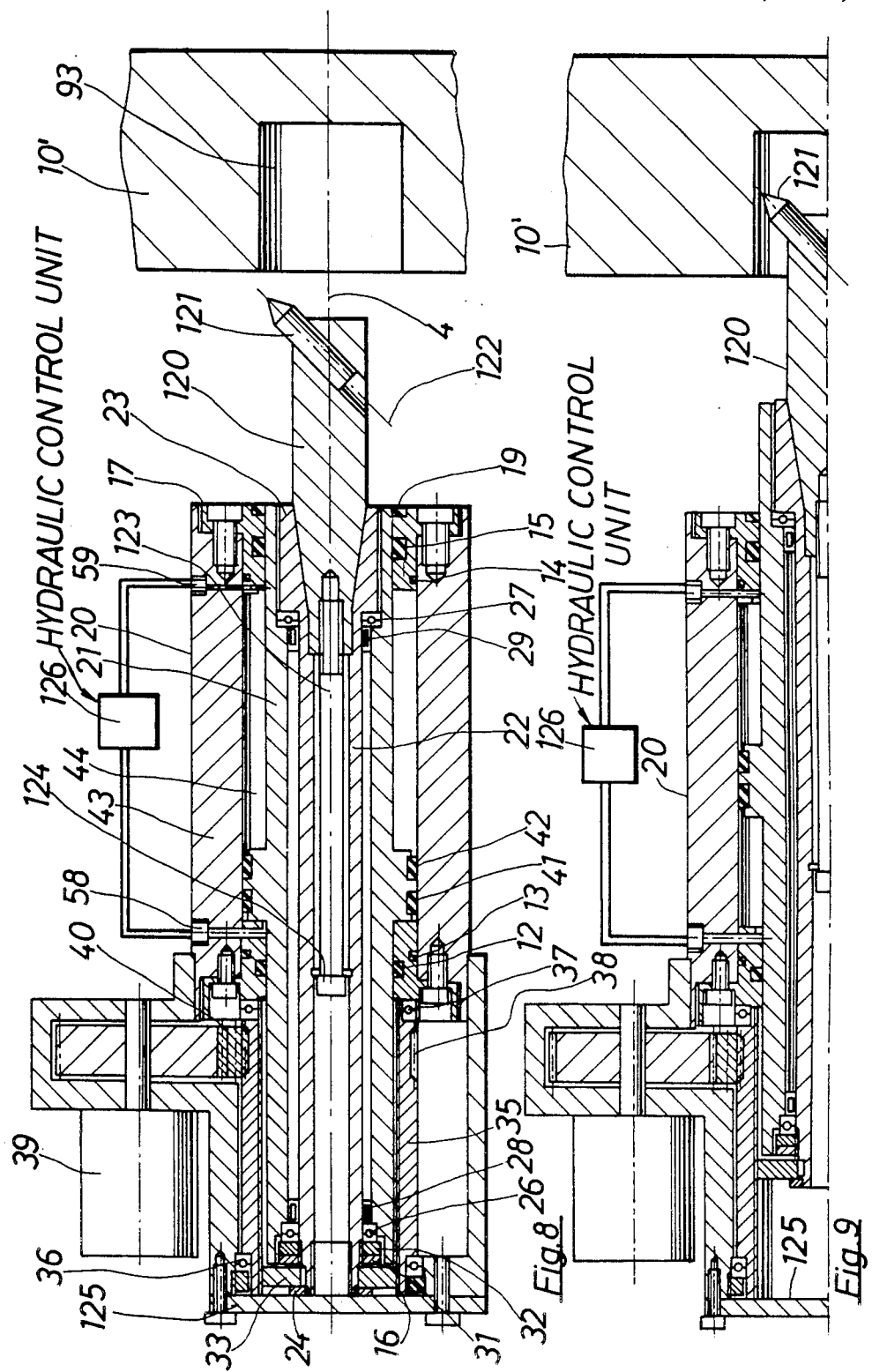

APPARATUS FOR RESTORING THE SURFACES SURROUNDING THE BORES OF METALLIC WORKPIECES

CROSS-REFERENCE TO RELATED CASE

The apparatus of the present invention constitutes an improvement over and a further development of the apparatus which is disclosed in the commonly owned copending U.S. patent application Ser. No. 472,038 filed Mar. 4, 1983 for "System and device for the inner-lining of metal bearing lugs".

BACKGROUND OF THE INVENTION

The present invention relates to apparatus for repairing or restoring the surfaces of metallic workpieces, especially for restoring surfaces which surround through bores or blind bores in workpieces or parts consisting of iron or the like. More particularly, the invention relates to improvements in apparatus which employ welding tools for deposition of fillets on the surfaces to be restored prior to machining of such surfaces to the desired size and/or shape.

The surfaces surrounding the holes or bores for bolts, pins, screws or like fasteners which are inserted into large and heavy metallic workpieces (e.g., into certain components of heavy-duty agricultural machines or the like) are subjected to extensive wear as a result of corrosion, play of the fasteners therein, unbalanced mechanical stresses and/or other influences. As a rule, the wear upon a bolt, screw, pin, stud, post or an analogous fastener presents no problems because the damaged fastener is simply replaced with a new one. The problem is much more serious if the damaged part is the piece which is provided with a through bore or hole or with a blind bore for reception of the fastener. Heretofore known proposals to repair such parts include increasing the diameter of the bore so as to remove the material which is adjacent to the damaged portion or portions of the surface surrounding the bore and introducing into the enlarged bore a prefabricated sleeve-like insert which is welded to the damaged workpiece. The insert then constitutes a new bearing or anchoring means for the fastener. A drawback of such proposal is that the cost of repairing the workpiece which is formed with the bore is very high for a number of reasons. Thus, it is necessary to store a supply of prefabricated inserts, it is necessary to enlarge the diameter of the bore by resorting to a first apparatus, and the insert must be welded to the workpiece by resorting to a discrete second apparatus or machine. Moreover, the welding operation invariably involves at least some deformation of the workpiece in the region of the enlarged bore. Still further, the material of the insert must be relatively soft because a hard or very hard insert is likely to become separated from the surrounding material of the workpiece upon completion of the welding operation. For example, an insert which is made of hardened iron is likely to become separated from a workpiece which also consists of iron. On the other hand, the utilization of relatively soft inserts entails pronounced wear thereon so that the useful life of a soft insert in a heavy-duty machine is very short.

The aforementioned copending patent application Ser. No. 472,038 discloses an apparatus which is designed to coat the damaged surface with a fillet of weldment and to thereupon machine the thus applied material so as to restore the dimensions of the bore in the metallic workpiece.

OBJECTS AND SUMMARY OF THE INVENTION

An object of the invention is to provide a novel and improved apparatus which simplifies the restoring operation and is sufficiently versatile to allow for the treatment of surfaces surrounding blind bores or through bores in metallic workpieces.

Another object of the invention is to provide an apparatus which can be rapidly converted from a welding machine to a material removing machine or vice versa.

A further object of the invention is to provide an apparatus which can be used to restore surfaces surrounding deep or shallow bores and which can be rapidly adjusted to allow for the treatment of surfaces surrounding small-diameter, medium-diameter or large-diameter bores or holes.

An additional object of the invention is to provide the apparatus with novel and improved means for separably supporting any one of a variety of tools including a welding tool, a grinding tool, a turning tool and/or another material removing tool.

Still another object of the invention is to provide an apparatus which does not necessitate the utilization of prefabricated inserts and which can be used to restore surfaces surrounding bores, recesses or analogous cavities in hard-to-reach portions of metallic workpieces.

A further object of the invention is to provide a novel and improved method of restoring the surfaces surrounding the bores of metallic workpieces.

Another object of the invention is to provide novel and improved material removing means and novel and improved material applying means in an apparatus of the above outlined character.

The invention is embodied in an apparatus for restoring a damaged surface which surrounds the bore in a metallic workpiece. The apparatus comprises a housing, a hollow shaft which is movable with the housing to a position of coaxiality with the bore (or the workpiece is movable to a position in which its bore is coaxial with the shaft) and which is axially movably but nonrotatably installed in the housing, a hollow spindle which is rotatably mounted in and shares the axial movements of the shaft and a front end portion of which is adjacent to the bore of the workpiece which is about to be repaired, a hollow first carrier which is separably mounted on the front end portion of the spindle and is rotatable therewith, a welding tool which is mounted on the carrier and is inclined with reference to the spindle, a pipeline including a first pipe which is coaxial with and is mounted in the spindle and a second pipe which is installed in the carrier and extends from the first pipe to the welding tool, and a flexible hose which is installed in the pipeline and serves to surround a length of longitudinally movable welding wire extending to the welding tool. The hose consists of an electrically insulating material and the pipes consist of current-conducting material so that they constitute a conductor which supplies electrical energy to the welding tool. The pipeline and the hose define an elongated channel for admission of a protective gas into the range of the welding tool.

The carrier comprises a coupling member which is separably supported by the spindle and defines a path extending substantially radially of the spindle, and a slide which is mounted on the coupling member and is movable along the aforementioned path. The welding tool is permanently or separably mounted on the slide. The second pipe extends through the slide and coupling member and includes a flexible portion which enables the second pipe to share the movements of the slide with reference to the coupling member. The just mentioned path can constitute a spiral path and the apparatus can further comprise means for moving the slide along the spiral path in response to rotation of the spindle with reference to the housing. The maximum dimension of the slide, as considered at right angles to the axis of the spindle, is preferably a small fraction of the corresponding maximum dimension of the housing, and the slide is preferably elongated (as considered in the axial direction of the spindle). The slide has an end portion which is remote from the housing and mounts the welding tool. The axis of the welding tool on such slide preferably makes an acute angle with the axis of the spindle.

The apparatus can further comprise a source of electrical energy connected to the welding wire in the hose, and the tool of such apparatus preferably comprises a welding nozzle which receives one end of the welding wire that is supplied through the hose and a gas-discharging nozzle which concentrically surrounds the welding nozzle. The welding tool defines a plurality of passages which communicate with the aforementioned channel, and the tool further comprises a distributor receiving protective gas from the passages and having ports which connect the passages with the interior of the gas-discharging nozzle. The latter spacedly surrounds the distributor and extends close to the outlet of the welding nozzle. The distributor can comprise a ring which abuts against the carrier and is provided with the aforementioned ports to direct protective gas substantially radially outwardly against the internal surface of the gas-discharging nozzle.

The apparatus is preferably furnished with a second carrier which is connectable with the front end portion of the spindle in lieu of the first carrier, and a material removing tool which is provided on the second carrier. The second carrier is preferably elongated and includes an end portion remote from the housing and supporting the material removing tool. The distance between the material removing tool and the spindle (when the spindle is connected with the second carrier) preferably approximates or equals the distance between the welding tool and the spindle (when the spindle is connected with the first carrier). Also, the maximum dimension of the second carrier (as considered at right angles to the axis of the spindle) preferably equals or approximates the corresponding maximum dimension of the first carrier and is thus a small fraction of the corresponding maximum dimension of the housing.

The means for rotating the spindle with reference to the shaft preferably comprises an elongated internal driver gear which is coaxial with the spindle and rotatably surrounds the shaft, and a driven second gear which mates with the internal gear in each axial position of the shaft and is connected to the spindle. The second gear is preferably mounted on the rear end portion of the spindle and the internal gear surrounds such rear end portion of the spindle and shares all axial movements of the shaft. The housing preferably includes a fluid-operated cylinder and the hollow shaft then includes a piston which is reciprocable in the cylinder and defines therewith two chambers which are sealed from one another when the shaft is caused to move axially in response to admission of a gaseous or hydraulic fluid into the one or the other chamber. Such apparatus preferably further comprises suitable deactivating means (e.g., a shutoff valve in a conduit connecting the two chambers) which is operable to establish communication between the two chambers and to thereby prevent axial movements of the shaft in response to admission of fluid into the one or the other chamber. When the spindle is connected with a further carrier, the deactivating means can be rendered operative while the slide of the second carrier is caused to move substantially radially of the corresponding coupling member in response to rotation of the spindle. The material removing tool on the second carrier can be a turning or an analogous tool and the apparatus employing such material removing tool preferably further comprises means for deactivating the means for moving the slide of the second carrier radially of the associated coupling member when the piston is free to move in its cylinder in response to admission of fluid into the one or the other chamber.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 1 is a fragmentary sectional view of a workpiece having a through bore which is surrounded by a damaged surface, further showing the extent to which such workpiece is treated in order to enlarge the diameter of the bore prior to the application of a fillet;

FIG. 2 is a similar fragmentary sectional view of the workpiece and shows several layers of fillets which are applied with the apparatus of the present invention;

FIG. 3 is a smaller-scale sectional view of the workpiece and a schematic elevational view of the improved apparatus, with an exchangeable head of the apparatus extending into the bore of the workpiece;

FIG. 5a illustrates the upper half of the structure which is shown in FIG. 4a, with the hollow shaft and the spindle shown in extended positions;

FIG. 5b illustrates the upper half of the structure which is shown in FIG. 4b, with the welding tool extending into the blind bore of the workpiece;

FIG. 6 is a greatly enlarged central longitudinal sectional view of the welding tool and of a portion of the carrier therefor;

FIG. 8 is a central longitudinal sectional view of the apparatus, with a carrier for a material removing tool shown in retracted position in front of a blind bore in the workpiece;

FIG. 9 shows the upper half of the structure of FIG. 8, with the material removing tool located in the blind bore of the workpiece;

DESCRIPTION OF THE PREFERRED EMBODIMENTS

Figure 4A:
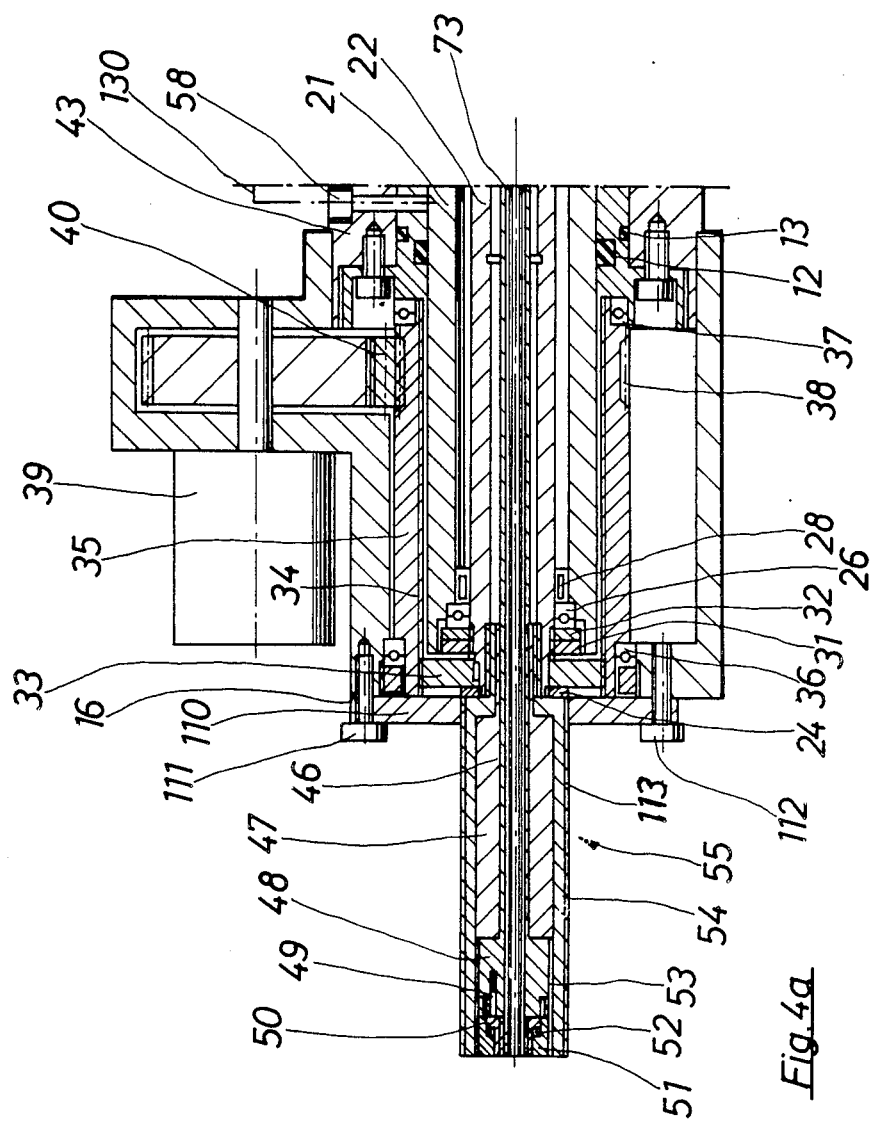
FIG. 4a is a central longitudinal sectional view of the rear portion of the improved apparatus which is set up for the application of fillets to the surface surrounding a blind bore in a metallic workpiece.

Referring first to FIG. 1, there is shown a portion of a metallic workpiece 10 having a through bore or hole 1 bounded by a damaged surface 2. The reference character 3 denotes the outline of the surface 2 prior to suffering damage as a result of extensive wear, corrosive influences and/or other factors. The first step involves enlarging the diameter of the bore 1 so that the thus enlarged bore is surrounded by a smooth cylindrical surface 5 whose axis 4 coincides with the axis of the original surface 3. The next step involves the application of metallic material onto the surface 5 of the enlarged bore so that the diameter of the bore is reduced below the diameter of the original surface 3. This is indicated by the broken lines 6 which denote the outline of the bore subsequent to application of metallic material to the internal surface of the workpiece 10.

As shown in FIG. 2, the diameter of the enlarged bore can be reduced by applying to the internal surface 5 of the workpiece 10 two layers of spiral fillets 7 and 8. The continuous spiral consisting of fillets 7 is applied directly to the surface 5 surrounding the enlarged bore, and the continuous fillet 8 is applied over the fillet 7, if necessary in staggered relation so as to ensure that the surface 6 surrounding the thus obtained smaller-diameter bore is surrounded by a solid mass of metallic material which is permanently bonded to the material of the workpiece 10. The number of layers of fillets can be reduced to one or increased to three or more, depending upon the extent of damage to the surface 2 surrounding the original bore and on the thickness of the fillets 7, 8. Such fillets are applied by a welding tool the details of which are illustrated in FIGS. 4a, 4b, 5a, 5b and 6. As mentioned above, each of the two layers of fillets 7 and 8 shown in FIG. 2 consists of a continuous helix which is applied in an uninterrupted operation by having the welding nozzle 68 (see particularly FIG. 6) travel along a helical path while the tool extends into the bore. The neighboring convolutions of each of the two layers of fillets abut and preferably partially overlap each other to further reduce the likelihood of the development of gaps in the material surrounding the bore. The next step involves removal of the surplus of material surrounding the bore, namely an increase of the diameter of the bore in the workpiece 10 so that the diameter matches the diameter of the original internal surface 3. If the bore is a tapped bore, the first step involves removal of material from the workpiece 10 so as to eliminate all traces of the original internal thread, and the next step involves the application of fillets so as to reduce the diameter of the bore in the workpiece 10 to less than the diameters of the crests or top lands of internal threads. The next step involves increasing the internal diameter so as to match the original internal diameter of the tapped bore, and the final step involves cutting threads into the thus obtained smooth internal surface of the workpiece.

In accordance with a feature of the present invention, all of the aforementioned operations upon the workpiece 10 can be carried out by resorting to a single apparatus 9 (see FIG. 3) which is provided with several exchangeable heads 11 one of which serves to increase the diameter of the bore 1 to provide the workpiece 10 with the internal surface 5, another of which serves for the application of fillets of the type shown in FIG. 2, a third of which serves to remove the surplus of applied metallic material so as to form in the workpiece a bore having again a surface whose dimensions and finish match those of the original surface 3, and still another head which (if necessary) can cut threads into the restored internal surface of the workpiece. The head 11 which is shown in FIG. 3 is assumed to include or to carry a material removing tool which is in the process of removing the surplus from the layer of fillets 8 so as to increase the diameter of the bore, i.e., to convert the surface 6 into a surface corresponding exactly to the original surface 3 in the bore 1 of the workpiece 10. The head carrying the tool which removes material around the damaged surface 2 can be the same head which carries the tool for removal of the excess of fillets. The workpiece 10 of FIG. 3 can be moved to a position in which the axis 4 of its bore coincides with the axes of rotary components of the apparatus 9 or vice versa.

Figure 4B:
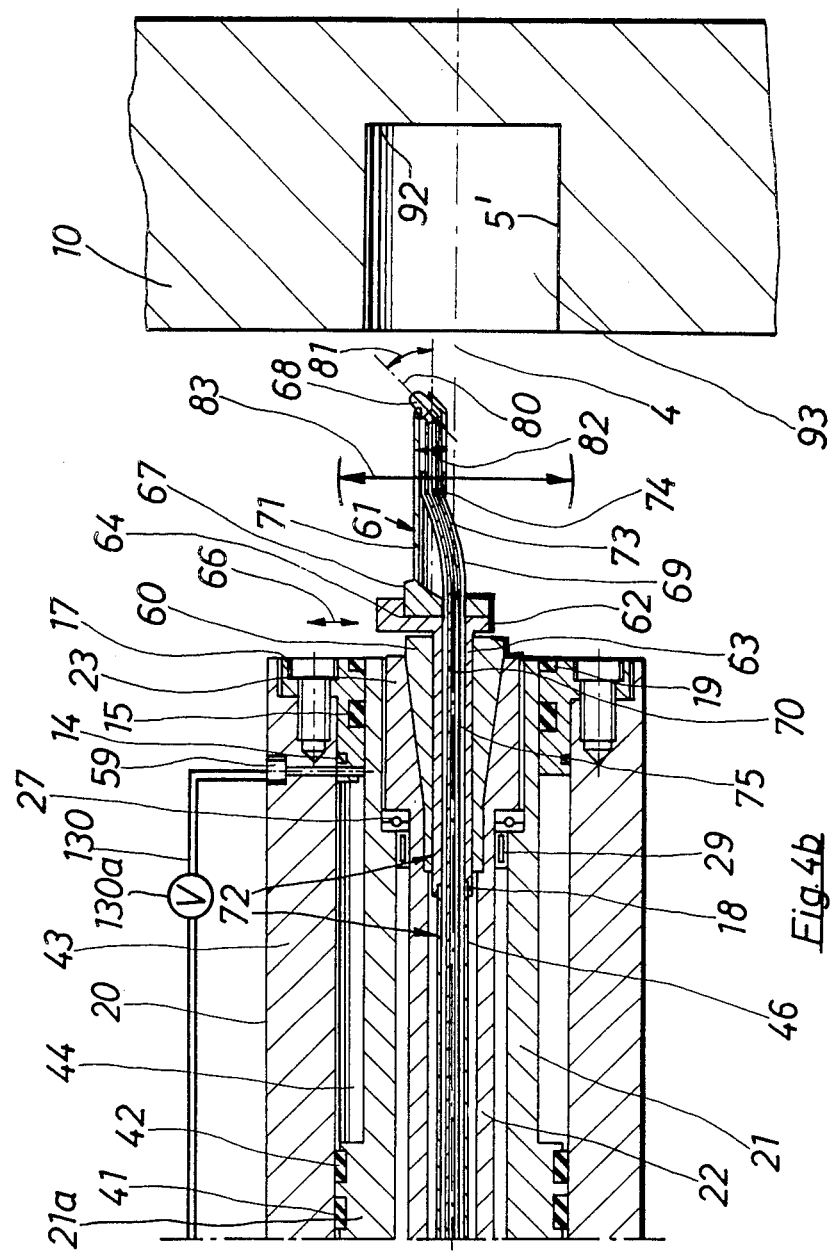
FIG. 4b is a central longitudinal sectional view of the front portion of the apparatus which is illustrated in FIG. 4a, and further showing the workpiece in proper position with reference to the welding tool which is held in retracted position.

The major part of the apparatus 9 is used irrespective of the nature of treatment to which the workpiece is subjected. In other words, the major part of the apparatus is put to use irrespective of whether the selected tool serves to enlarge the diameter of the bore which is surrounded by a damaged surface, to apply metallic material to the surface surrounding the thus enlarged bore, to remove the surplus of added metallic material, or to cut a thread into the internal surface which is surrounded by the added material subsequent to removal of the surplus. The details of that portion of the apparatus 9 which is used irrespective of the nature and purpose of the selected material applying or material removing tool can be seen in FIGS. 4a, 4b, 5a, 5b, 7, 8, 9 and 10. This portion of the apparatus comprises an elongated hollow tubular housing 20 which can be positioned in such a way that its axis coincides with the axis 4 of the bore in the workpiece 10. FIG. 4b shows a modified workpiece 10' wherein the bore is a blind bore 93 bounded by a cylindrical surface 5' (corresponding to the surface 5 in FIG. 1 or 2) and a flat bottom surface 92. The housing 20 surrounds a hollow shaft 21 which is movable axially toward and away from the blind bore 93 of the workpiece 10'. The mounting of the shaft 21 in the housing 20 is such that the shaft is held against rotation relative to the housing. This shaft accommodates a rotary spindle 22 which is mounted in such a way that it shares all axial movements of the shaft 21 with reference to the housing 20. The front end portion 23 of the spindle 22 constitutes a holder serving to support a carrier 61 for the welding tool including the welding nozzle 68 and a gas-discharging nozzle including a shroud 78 concentrically surrounding the nozzle 68 (see FIG. 6). The rear portion 24 of the spindle 22 receives torque from a prime mover 39 (for example, a variable-speed electric motor) in a manner to be described below. The spindle 22 is mounted in two sets of antifriction bearings including two ball bearings 26, 27 and two needle bearings 28, 29. The rear portion 24 of the spindle 22 is formed with external threads to take two nuts 31 and 32. The axial bore of the spindle 22 accommodates a number of component parts which will be described below and which are removable and replaceable by different parts, depending on the nature and purpose of the tool which is supported by the front portion 23.

The means for rotating the spindle 22 with reference to the hollow shaft 21 comprises a driven gear 33 which is keyed to the rear portion 24 of the spindle and is in permanent mesh with the teeth 34 of an elongated internal gear 35 surrounding the rear portion 24 of the spindle 22. The teeth 34 extend along the full axial length of the elongated internal gear 35 to thus ensure that the gear 33 remains in mesh with the gear 35 in each axial position of the shaft 21 and spindle 22 relative to the housing 20. The internal gear 35 has a front portion provided with an annulus of external teeth 38 meshing with the teeth of a pinion 40 on the output element of the prime mover 39. Thus, when the prime mover 39 is on, its output element drives the pinion 40 which, in turn, drives the internal gear 35 which surrounds the shaft 21 in the housing 20. The internal teeth 34 of the gear 35 mesh with the external teeth of the gear 33 on the rear portion 24 of the spindle 22 (the rear portion 24 and the gear 33 are outwardly adjacent to the rear end of the hollow shaft 21) so that the spindle rotates relative to the hollow shaft 21 and housing 20. The internal gear 35 is held against axial movement relative to the shaft 21. The reference characters 36 and 37 denote antifriction bearings (for example, ball bearings) for the internal gear 35. Such ball bearings are installed in the housing 20 and surround the two end portions of the internal gear 35.

The housing 20 includes a portion 43 which can be said to constitute the cylinder of a double-acting fluid operated (preferably hydraulic) motor. A portion 21a of the hollow shaft 21 constitutes a piston which is surrounded by sealing rings 41, 42 (see FIG. 4b) and is reciprocable in the cylinder 43 in response to admission of pressurized fluid into one of two chambers 44 which flank the piston 21a. In this manner, the shaft 21 and the spindle 22 can be moved in the direction of the axis 4 relative to the stationary housing 20. The two chambers 44 in the cylinder 43 can receive a pressurized fluid by way of discrete supply conduits 58 and 59. If the fluid is admitted via conduit 58, the shaft 21 is moved toward the workpiece 10', namely, in a direction to the right, as viewed in FIG. 4b. The shaft 21 is retracted in response to admission of pressurized fluid via conduit 59. As mentioned above, the spindle 22 is compelled to share all axial movements of the shaft 21. The reference characters 12, 13, 14, 15 and 19 denote suitable sealing elements (such as O-rings) which prevent communication between the chambers 44 and the surrounding atmosphere. The discharge end of the conduit 59 is closely adjacent to the front end face 17 of the housing 20, and the discharge end of the conduit 58 is located substantially midway between the front end face 17 and the rear end face 16 of the housing 20.

The heretofore described parts of the apparatus 9 are used irrespective of whether the apparatus serves to remove material from the workpiece or to apply metallic material to the internal surface or surfaces of the workpiece. Therefore, such parts are denoted by identical reference characters in each Figure of the drawing.

The details of the head which is employed when the apparatus is to apply molten metallic material to the internal surface or surfaces surrounding a through bore 1 or a blind bore 93 of a workpiece 10 or 10' are shown in FIGS. 4a, 4b, 5a and 5b.

The housing 20 supports an separable attachment 55 which is adjacent to its rear end face 16. The attachment 55 surrounds an elongated pipe 46 which extends into the spindle 22 and all the way to the holder 23. The front end portion of the pipe 46 is externally threaded and meshes with internal threads of a nut 18 of a second pipe 63 forming part of a composite pipeline 72 (FIG. 4b). The pipe 46 consists of an electrically conducting material and serves as a component part of a conductor for conveying electrical energy to the welding nozzle 68. The rear portion of the pipe 46 extends through a sleeve 47 which forms part of the attachment 55 and is made of an insulating material. The front end portion of the pipe 46 is adjacent to the rear end portion of a wedge-like insulator 60 which is inserted into the holder 23 of the spindle 22. The intermediate portion of the pipe 46 is insulated from the surrounding components in that it is spaced apart therefrom in the region between the insulator 60 and the sleeve 47. The rear end portion of the pipe 46 is connected to or made integral with a cylindrical conductor 48 which is electrically connected to a current-conducting flange-like terminal 50 of the attachment 55 by a carbon brush 49. The arrangement is such that the brush 49, conductor 48 and pipe 46 can rotate with reference to the stationary terminal 50. The reference character 51 denotes an insulator which surrounds the terminal 50, and the reference character 52 denotes an antifriction ball bearing for the assembly including the conductor 48, brush 49 and pipe 46. The terminal 50 is stationary and is connected to a source of electrical energy, not shown. The attachment 55 further comprises a cylindrical shell 54 which surrounds the insulating sleeve 47 and is separated from the conductor 48 by an air gap 53.

When the prime mover 39 drives the spindle 22, the pipe 46 shares such angular movement and rotates with the conductor 48 and insulating sleeve 47. Current flows from the terminal 50 (which is insulated from the shell 54) to the conductor 48 and pipe 46. The housing 20 and the shell 54 are fully insulated from such current-conducting components. The terminal 50 has an axial bore 56 (see FIG. 5a) and the conductor 48 has an axial bore 57 which is in register with the bore 56 and with the bore of the pipe 46.

The aforementioned wedge-like insulator 60 in the front end portion or holder 23 of the spindle 22 removably supports the carrier 61. The latter comprises a coupling member 62 which extends into the insulator 60 and, to this end, comprises a pipe 63 which is an electrical conductor and is provided with the aforementioned nut 18 for the externally threaded front end portion of the pipe 46. The pipes 63 and 46 together constitute the aforementioned pipeline 72 which conducts electrical energy to the welding nozzle 68. The pipes 46, 63 of the pipeline 72 can be readily separated from each other by the simple expedient of unscrewing the pipe 46 from the nut 18 on the rear end portion of the pipe 63.

The coupling member 62 of the carrier 61 comprises a preferably dovetailed guide portion 64 which extends substantially radially of the spindle 22 and serves to reciprocably support a second member (hereinafter called slide) 67 of the carrier 61. The directions in which the slide 67 is movable with reference to the guide portion 64 of the coupling member 62 are indicated by a double-headed arrow 66. The carrier 61 is elongated, as considered in the axial direction of the spindle 22, and its front end portion (namely, that end portion which is remote from the housing 20) carries the welding nozzle 68. The entire carrier 61 preferably consists of an electrically conducting metallic material and serves to convey current from the pipe 46 to the nozzle 68.

The pipeline 72 confines a portion of an elongated flexible hose 69. The slide 67 is formed with a bore 71 in full or partial register with an axial bore 70 of the coupling member 62. The flexible hose 69 can be said to constitute a deformable part of the pipe 63 and renders it possible to move the slide 67 radially of the coupling member 62 when the need for such adjustment of the welding nozzle 68 with reference to the workpiece 10' arises. The space which is surrounded by the pipeline 72 forms part of a continuous passage which extends from the terminal 50 and all the way to the rear portion of the welding nozzle 68. Such passage receives with clearance a flexible hose 73 which consists of electrically insulating material and surrounds a length of welding wire 74. The wire 74 is fed all the way into the bore 79 of and extends beyond the welding nozzle 68 (see FIG. 6). The manner in which the welding wire 74 is fed lengthwise so as to furnish molten metallic material for the fillets 7 and 8 of FIG. 2 is not specifically illustrated in the drawing. The external diameter of the hose 73 is smaller than the diameter of the space in the pipeline 72 so as to provide an annular channel 75 for admission of a protective gas into the interior of the aforementioned shroud 78 constituting the gas-discharging nozzle on the slide 67 and concentrically surrounding the body of the welding nozzle 68. The flexibility and length of the hose 69 suffice to ensure that the slide 67 can move radially of the coupling member 62 to the extent which is determined by the length of the path defined by the guide portion 64 on the coupling member.

The axis 80 (see FIG. 4b) of the welding nozzle 68 makes an acute angle 81 with the axis of the spindle 22. The nozzle 68 is installed at the front end of the slide 67, namely, at a locus which is remote from the housing 20. Basically, the slide 67 is a slender elongated pipe having an outer diameter 82 which is a small fraction of the corresponding transverse dimension 83 of the housing 20. The tip of the welding nozzle 68 extends only slightly beyond the slide 67 of the carrier 61. This can be readily seen in FIG. 6. Such mounting of the welding nozzle 68 is desirable because it allows for its introduction into small-diameter bores of the workpieces.

As mentioned above, the shroud 78 of the gas-discharging nozzle of the structure which is mounted on the slide 67 is concentric with the welding nozzle 68 and extends forwardly into the region of the outlet of the welding nozzle. The foremost portion of the welding wire 74 extends beyond the flexible hose 73 and into the axial bore 79 of the welding nozzle 68. The rear end portion of the wire 74 is connected to a source of electrical energy. As mentioned above, the nozzle 68 is electrically connected directly with the slide 67 of the carrier 61.

A passage 85 of the slide 67 serves to convey protective gas from the channel 75 and communicates with a plurality of elongated passages 86 which are machined into the front end portion of the slide 67 and admit protective gas into the interior of a substantially cup-shaped distributor 87. The distributor 87 has a ring-shaped portion 88 which is provided with radially outwardly extending ports 89 permitting protective gas to flow from the passages 86 against the internal surface of the shroud 78 forming part of the gas-discharging nozzle. The rear end face of the ring-shaped portion 88 of the distributor 87 is in direct contact with the bottom surface in a recess which is provided in the front end portion of the slide 67. As can be seen in FIG. 6, the inner portion of the distributor 87 surrounds a smaller-diameter rear portion of the welding nozzle 68, and such rear portion of the nozzle 68 is threadily (i.e., exchangeably) connected with the slide 67. It will be readily appreciated that protective gas which issues from the ports 89 forms a circumferentially complete envelope which surrounds the locus of application of molten metallic material of the welding wire 74 to the surface or surfaces surrounding the bore 1 or 93 in the workpiece 10 or 10'.

The spindle 22 can also be moved axially by a nut 110 which is separably secured to the rear end face 16 of the housing 20 be several screws 111, 112 or other suitable fasteners. The internal thread of the nut 110 meshes with the external thread 113 of the shell 54 forming part of the aforementioned attachment 55. When the prime mover 39 is on and rotates the spindle 22, the spindle rotates the shell 54 of the attachment 55 whereby the shell 54 moves forwardly or rearwardly (depending on the direction of rotation of the prime mover 39) because its external thread 113 is in mesh with the internal thread of the nut 110. This mode of moving the spindle 22 and shaft 21 axially with reference to the housing 20 is resorted to when the aforementioned hydraulic motor including the cylinder 43 and piston 21a is deactivated by a conduit 130 which connects the conduits 58, 59 and preferably contains a shutoff valve 130a Q which can be closed or opened to establish or interrupt direct communication between the two chambers 44 in the cylinder 43.

The operation of the apparatus which embodies the structure of FIGS. 4a, 4b, 5a, 5b and 6 is as follows: It is assumed that the internal surfaces 5' and 92 of the blind bore 93 in the workpiece 10' have been machined so that the diameter of this bore exceeds the diameter of the original bore. The spindle 22 is then moved to a position in which its axis coincides with the axis 4 of the blind bore 93 in the workpiece 10', and the slide 67 of the carrier 61 is shifted radially of the coupling member 62 so as to move the tip or outlet of the welding nozzle 68 close to the cylindrical internal surface 5' surrounding the blind bore 93 in the workpiece 10'.

Figure 7:
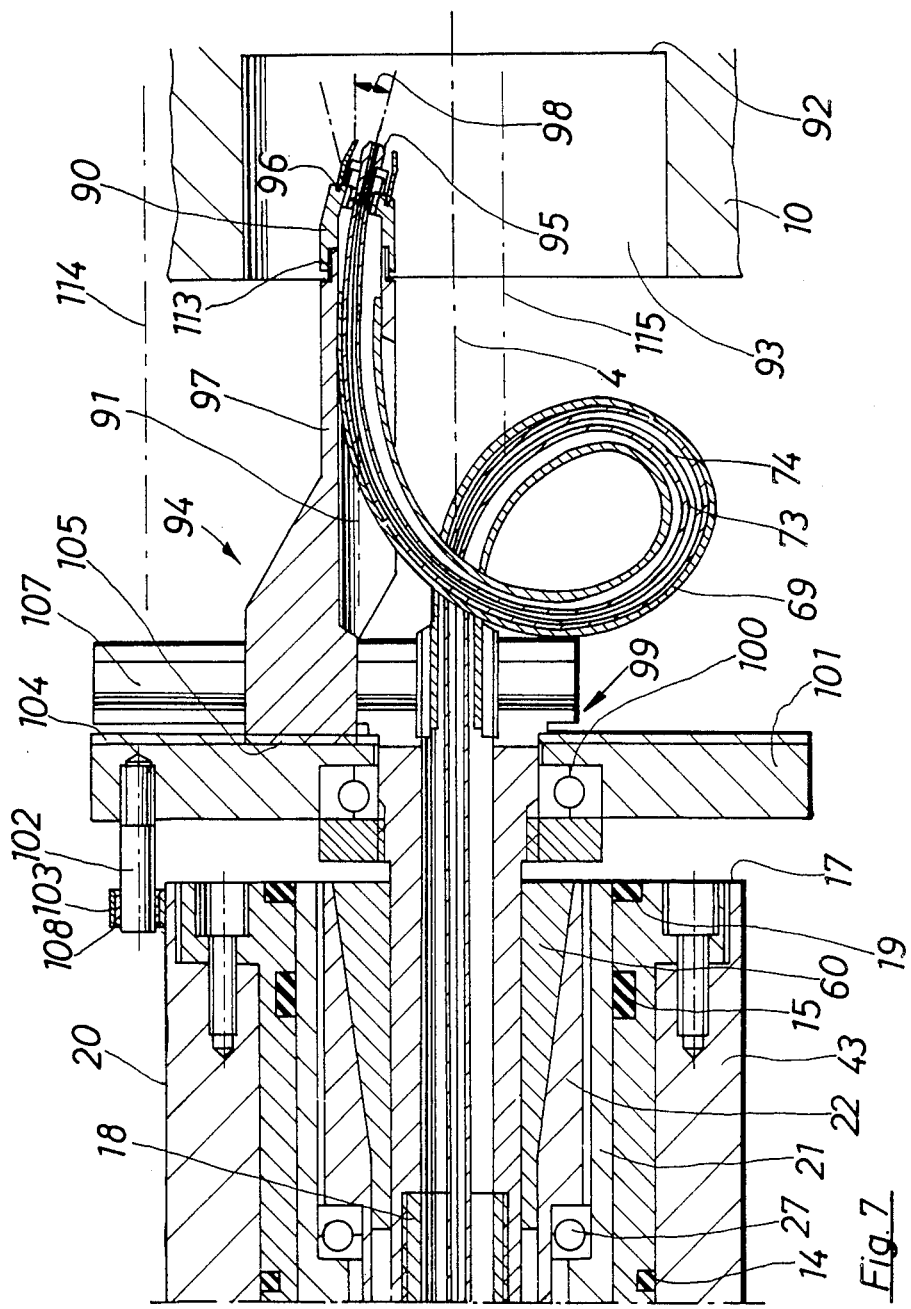
FIG. 7 is a fragmentary central longitudinal sectional view of a portion of the structure which is shown in FIGS. 4a and 4b but with a modified welding tool wherein the slide of the carrier is caused to perform a movement along a helical path in response to rotation of the spindle about its axis.

If the apparatus 9 is to apply fillets of metallic material also to the end face 92 in the blind bore 93 of the workpiece 10', the carrier 61 of FIGS. 4a–5b is replaced with a modified carrier 94 which is illustrated in FIG. 7. The carrier 94 distinguishes from the carrier 61 of FIGS. 4a–5b in that the inclination of the axis of its welding nozzle 95 with reference to the axis 4 of the blind bore 93 is less pronounced than that of the nozzle 68. This can be readily appreciated by comparing the acute angle 81 of FIG. 4b with the acute angle 98 shown in FIG. 7. The nozzle 95 of FIG. 7 extends forwardly from the front end face 96 of the nipple 90 which is separably attached to the slide 97 of the carrier 94 by a coupling 1113. The coupling 1113 enables the nipple 90 to turn about an axis 91 which is parallel to the axis 4 of the blind bore 93. Means is preferably provided for arresting the nipple 90 in a selected angular position with reference to the slide 97. Such adjustability of the nipple 90 about the axis 91 is desirable and advantageous because it allows for the introduction of metallic fillets into the corners between mutually inclined internal surfaces of the workpiece 10'.

The guide portion 64 of FIG. 4b is replaced with a modified guide means 99 which causes automatic radial movement of the slide 97 in response to rotation of the spindle 22 about the axis 4. This enables the slide 97 to move between two extreme positions which are indicated in FIG. 7 by phantom lines 114 and 115. The guide means 99 comprises a substantially disc-shaped coupling member or guide 101 which is held against rotation with reference to the housing 20 by a stud 102 extending into a hole 103 defined by a sleeve 108 which is secured to the external surface of the housing 20. The sleeve 108 consists of an electrically insulating material.

The front side of the disc-shaped coupling member or guide 101 has a helical groove 104 for one or more teeth 105 provided at the rear end of the carrier 94. The rear portion of the carrier 94 is further reciprocable in a radially extending guide 107 which rotates with the front end portion of the spindle 22. Such front end portion rotates in an antifriction ball bearing 100 which is installed in the stationary disc-shaped guide 101. Thus, as the teeth 105 of the carrier 94 track the path which is defined by the helical groove 104 in the front end face of the guide 101, the carrier 94 moves radially of the spindle 22, either toward or away from the spindle, depending on the direction of rotation of the prime mover 39 (not shown in FIG. 7). The welding nozzle 95 is compelled to share such radially outward or radially inward movement of the carrier 94 along a substantially helical path. The result is the application of a spiral-shaped fillet to the end face 92 in the bottom region of the blind bore 93 in the workpiece 10'. The angular movement of the spindle 22 is synchronized with or depends upon the radial position of the welding nozzle 95 so that the application of a fillet to the bottom surface 92 takes place at a substantially constant rate.

It will be appreciated that the spindle 22 need not and should not move axially during application of metallic material to the bottom surface 92 in the blind bore 93 shown in FIG. 7. This is ensured by detaching the nut 110 from the housing 20 by the simple expedient of removing the screws 111 and 112. The hydraulic cylinder and piston unit 43, 21a is also ineffective because the shutoff valve 130a in the conduit 130 is open and permits gaseous or hydraulic fluid to flow freely between the two chambers 44 in the cylinder 43.

The distance between the material removing tool 121 and the housing 20 (when the holder 120 is connected to the spindle 22) is preferably the same or nearly the same as that between the welding nozzle 68 and the housing 20 (when the spindle 22 is connected with the carrier 61). Also, the maximum transverse dimension of the carrier or holder 120 preferably matches or approximates that (82) of the slide 67. This ensures that the housing 20 need not be shifted relative to the workpiece 10 or 10' when the carrier 61 is replaced with the carrier 120 or vice versa.

FIGS. 8 and 9 illustrate the apparatus 9 and a modified head which is provided with a material removing tool 121 serving to remove material from the cylindrical surface surrounding the blind bore 93 in the workpiece 10'. The tool 121 is installed in a holder or carrier 120 having an elongated rod-like extension 123 extending into the front portion 23 of the spindle 22. The reference character 122 denotes the axis of the tool 121; such axis makes an acute angle with the axis 4 of the blind bore 93. A locking device 124 is provided at the rear end of the extension 123 to detachably secure the tool holder 120 to the spindle 22. The tool 121 can constitute a turning tool which can remove the surplus of fillet material in the interior of the blind bore 93. This tool is adjustable in the direction of the axis 122 and can be fixed to the tool holder 120 in a selected position so as to ensure that the diameter of the bore in the finished workpiece 10' will match the diameter of the original bore, namely, the diameter of the cylindrical internal surface corresponding to the surface 3 shown in FIG. 1.

The attachment 55 is disconnected from the rear end of the housing 20, and such rear end is closed by a cover 125 which is secured to the corresponding end portion of the housing by several screws or analogous fasteners. The inner side of the cover 125 abuts against the rear end face 16 of the housing 20.

When the spindle 22 is connected with the tool holder 120, it is caused to move axially toward the workpiece 10' by deactivating the valve 130a and by connecting the conduits 58 and 59 with a hydraulic control unit 126 which can admit pressurized fluid to the rear or left-hand chamber of the cylinder 43 at a desired rate (via conduit 58) so as to ensure controlled forward movement of the tool 121 while the latter rotates about the axis 4 together with the spindle 22 which is driven by the prime mover 39 in a manner as described above with reference to FIGS. 4a–5b.

Figure 10:
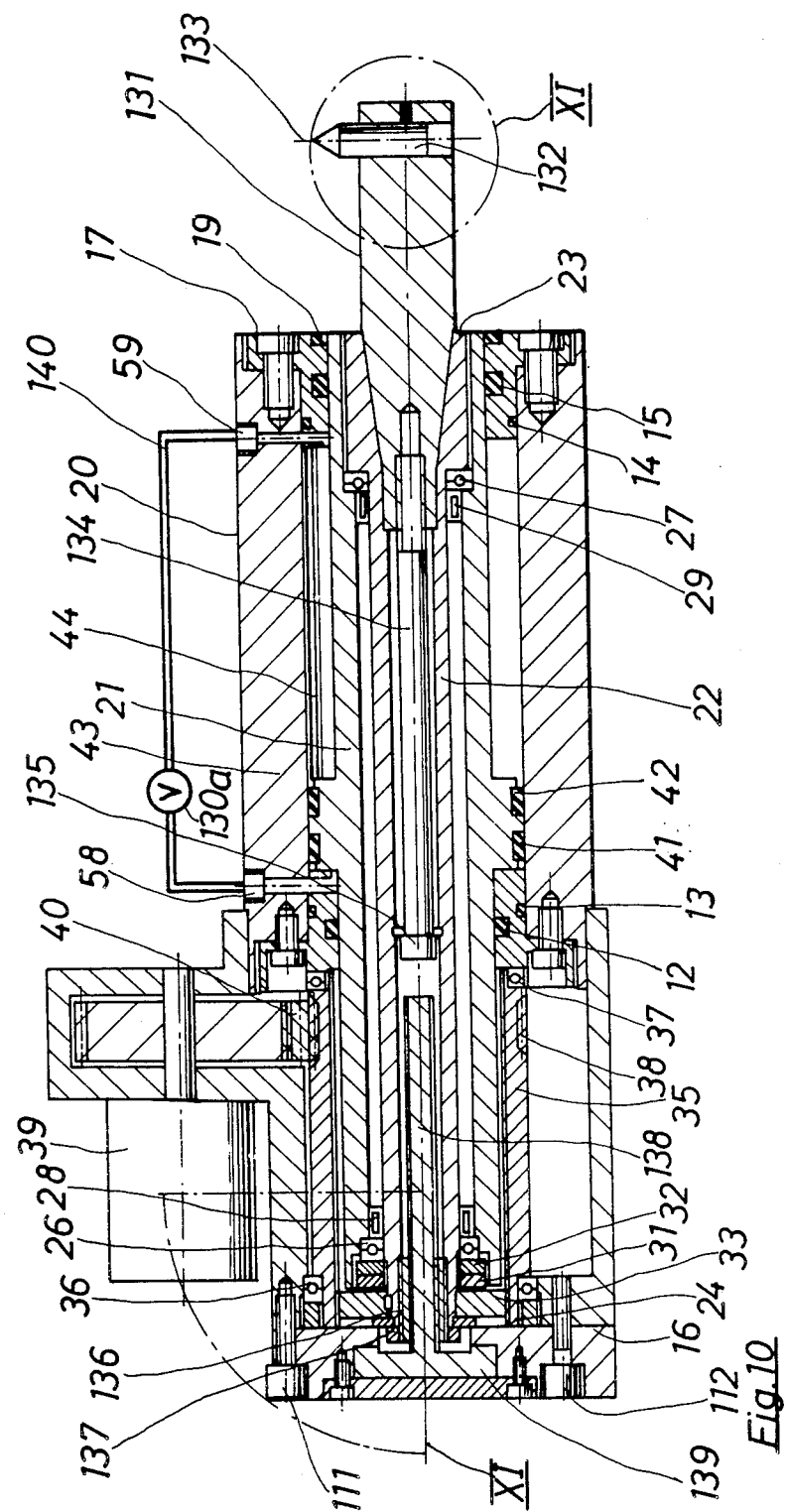
FIG. 10 is a central longitudinal sectional view of the apparatus, showing a thread cutting tool which is connected to the front end portion of the spindle.
Figure 12:
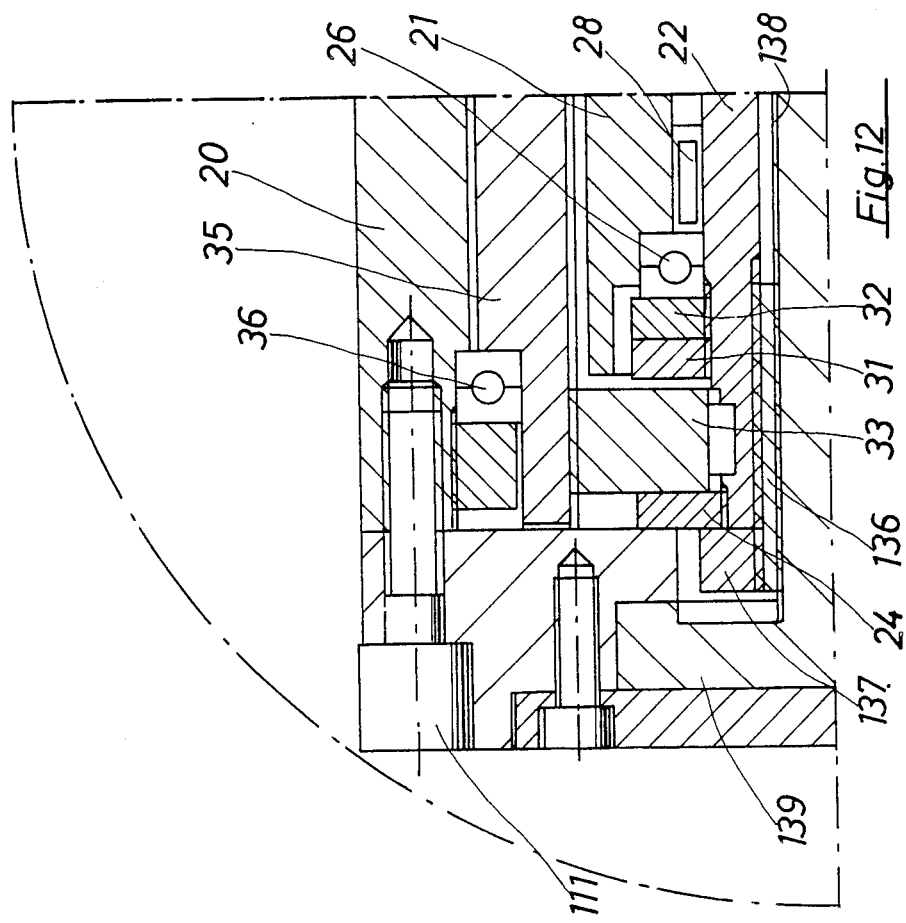
FIG. 12 is an enlarged view of a detail within the phantom-line quarter circle XII in FIG. 10.
Figure 11:
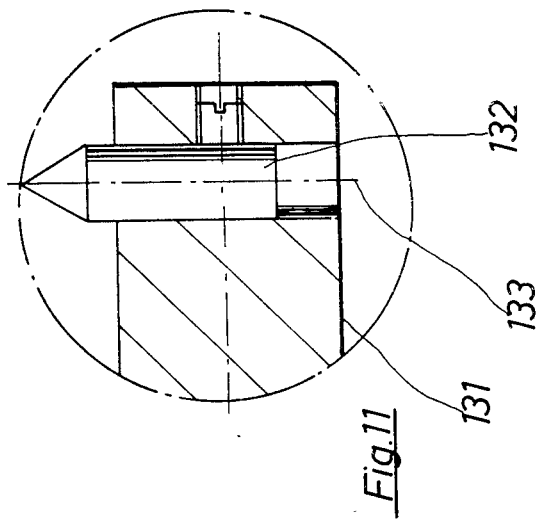
FIG. 11 is an enlarged view of a detail within the phantom-line circle XI in FIG. 10.

FIGS. 10, 11 and 12 illustrate the structure of FIGS. 4a–5b with the exception that the carrier 61 is replaced with a modified carrier or holder 131 for a thread cutting tool 132. The axis 133 of the tool 132 extends at right angles to the axis of the spindle 22. The holder 131 has a slender rearwardly extending rod-like extension 134 which fits into the spindle 22. A locking device 135 at the rear end of the extension 134 removable secures the holder 131 to the spindle 22. The tool 132 is adjustable in the direction of its axis and can be fixed to the holder 131 in a selected axial position depending on the diameter of the bore in the workpiece and upon the depth of the thread which is to be cut in the surface surrounding such bore. The locking device 135 not only ensures that the holder 131 shares all angular movements of the spindle 22 but it also ensures that the holder 131 shares all axial movements of the shaft 21. The latter moves axially with the spindle 22.

The means for moving the spindle 22 and the shaft 21 axially comprises a nut 136 which is secured to the rear end portion of the spindle 22 by a lock nut 137 and meshes with a feed screw 138. The feed screw 138 extends into the interior of the rear portion of the spindle 22 without coming in contact therewith and is provided on a cover 139 which is bolted (at 111, 112) or otherwise secured to the rear end portion of the housing 20 so that it abuts against the end face 16. The feed screw 138 cannot rotate relative to the housing 20. Furthermore, this feed screw is held against axial movement with the shaft 21 and/or spindle 22. Consequently, when the spindle 22 is driven by the prime mover 39, the nut 136 (which is secured thereto) rotates relative to the fixed feed screw 138 so that the spindle 22 moves forwardly or rearwardly, depending on the direction of rotation of the prime mover 39. The hydraulic system including the chambers 44 is short-circuited by the shutoff valve 130a in the conduit 140 connecting the conduits 58 and 59.

It is clear that the material removing tools which are shown in the drawing can be replaced with other types of material removing tools. For example, the tool holder 131 can be connected with a grinding wheel or with several grinding wheels which can treat the surfaces surrounding the through bore or the blind bore in the workpiece. If a grinding wheel is used, the apparatus can comprise a discrete prime mover or transmission for rotating the grinding wheel about its own axis.

An important advantage of the improved apparatus is that it can remain in a selected position with reference to the workpiece irrespective of whether it carries a material applying or a material removing tool. Of course this presupposes that the workpiece 10 or 10' can be shifted with reference to the housing 20 so as to allow for detachment of one holder or carrier and the application of a different second carrier. Another important advantage of the improved apparatus is that all parts which must extend all the way to the welding nozzle can be introduced through the rear end of the spindle 22 so that the front end portion of such spindle need not carry any parts with the exception of the selected carrier and the tool or tools on such carrier. This is particularly advantageous when the apparatus is connected with a welding nozzle because the welding nozzle can be readily moved to an optimum position for the application of fillets to the cylindrical internal surface or to the bottom surface in the bore of the workpiece.

The means for moving the spindle 22 axially during the application of fillets for the cylindrical internal surface of the workpiece and during cutting of threads into the fillets (once the surplus of their material is removed) can be the same. However, it is often desirable to provide discrete first means for moving the spindle 22 axially for the application of fillets and discrete second means for moving the spindle 22 axially during cutting of threads. This ensures that the rate at which the spindle is moved axially is best suited for the application of fillets in contact with one another or in partial overlap with each other, and for proper advancement of the spindle while it carries a thread cutting tool. The placing of the means for mechanically advancing the spindle 22 axially at the rear end of the housing 20 is desirable and advantageous because such moving means are readily accessible at that end of the apparatus 9 which is remote from the means for supporting and fixing the workpiece.

The means for moving the spindle 22 axially with resort to a hydraulic or pneumatic fluid is preferably employed during removal of material from the workpiece 10, 10' or fillets 7, 8 in the bore of such workpiece. As mentioned above, this is achieved by the cylinder 43 and piston 21a. At such time, the mechanical means for advancing the spindle 22 axially is rendered inactive by detaching it from the housing 20 or by otherwise preventing it from imparting axial movements to the rotating spindle 22. On the other hand, when the spindle 22 is moved axially by mechanical means, the hydraulic or pneumatic system is rendered inoperative by the aforementioned valve 130a in the conduit 130 or 140.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. Apparatus for restoring a damaged surface surrounding a provided bore in a metallic workpiece, comprising a housing; a hollow shaft movable to a position of coaxiality with the bore and being axially movable but non-rotatably installed in said housing; a hollow spindle rotatably mounted in and arranged to share the axial movements of said shaft, said spindle being coaxial with said shaft and having a front end portion adjacent to the bore of the workpiece which is about to be repaired; a hollow first carrier separably mounted on the front end portion of and rotatable with said spindle; a welding tool mounted on said carrier and being inclined with reference to said spindle; a pipeline including a first pipe coaxial with and mounted in said spindle and a second pipe installed in said carrier and extending from said first pipe to said tool; and a flexible hose installed in said pipeline and arranged to surround a length of longitudinally movable welding wire extending to said tool.

2. The apparatus of claim 1, wherein said hose consists of an electrically insulating material and said pipes consist of current-conducting material and are electrically connected to one another to constitute a conductor for supplying electrical energy to said tool.

3. The apparatus of claim 2, wherein said pipeline and said hose define an elongated channel for admission of a protective gas to said tool.

4. The apparatus of claim 1, wherein said carrier comprises a coupling member which is separably supported by said spindle and defines a path extending substantially radially of said spindle, said carrier further comprising a slide mounted on said coupling member and movable along said path, said tool being provided on said slide.

5. The apparatus of claim 4, wherein said second pipe extends through said coupling member and said slide and includes a flexible portion serving to share the movements of said slide with reference to said coupling member.

6. The apparatus of claim 5, wherein said path is a spiral path and further comprising means for moving said slide along said spiral path in response to rotation of said spindle with reference to said housing.

7. The apparatus of claim 4, wherein the maximum dimension of said slide at right angles to the axis of said spindle is a small fraction of the corresponding maximum dimension of said housing and said slide is elongated in the axial direction of said spindle.

8. The apparatus of claim 7, wherein said slide has an end portion remote from said housing, said tool being mounted on the end portion of said slide and having an axis making an acute angle with the axis of said spindle.

9. The apparatus of claim 1, wherein said hose consists of an electrically insulating material and said pipes consist of a current-conducting material and are electrically connected to one another to constitute a conductor for supplying electrical energy to said tool, said pipeline and said hose defining an elongated channel for admission of a protective gas to said tool and further comprising a source of electrical energy connected to the welding wire in said hose, said tool including a welding nozzle receiving one end of the wire which is supplied via said hose and a gas-discharging nozzle concentrically surrounding said welding nozzle.

10. The apparatus of claim 9, wherein said welding nozzle has an outlet and said tool defines a plurality of passages communicating with said channel, said tool further comprising a distributor receiving protective gas from said passages and having ports connecting said passages with the interior of said gas-discharging nozzle, said gas-discharging nozzle spacedly surrounding said distributor and extending close to the outlet of said welding nozzle.

11. The apparatus of claim 10, wherein said distributor includes a ring which abuts against said carrier and said ports are provided in said ring to direct protective gas substantially radially outwardly against said gas-discharging nozzle.

12. The apparatus of claim 1, further comprising a second carrier connectable with said spindle in lieu of said first carrier and a material removing tool provided on said second carrier.

13. The apparatus of claim 12, wherein said second carrier is elongated and includes an end portion remote from said housing and supporting said material removing tool.

14. The apparatus of claim 13, wherein the distance between said material removing tool and said spindle, when the latter is connected with said second carrier, at least approximates the distance between said welding tool and said spindle when the latter is connected with said first carrier.

15. The apparatus of claim 14, wherein the maximum dimension of said second carrier, at right angles to the axis of said spindle, at least approximates the corresponding maximum dimension of said first carrier and is a small fraction of the corresponding maximum dimension of said housing.

16. The apparatus of claim 1, further comprising means for rotating said spindle including an elongated internal driver gear coaxial with said spindle and rotatably surrounding said shaft, and a driven second gear provided on said spindle and mating with said internal gear in each axial position of said shaft with reference to said housing.

17. The apparatus of claim 16, wherein said spindle further includes a rear end portion mounting said second gear, said internal gear surrounding the rear end portion of said spindle and being arranged to share all axial movements of said shaft.

18. The apparatus of claim 1, wherein said housing includes a fluid-operated cylinder and said shaft includes a piston which is reciprocable in said cylinder and defines therewith two chambers which are sealed from one another when said shaft is caused to move axially in response to admission of fluid into a selected one of said chambers, and further comprising deactivating means operable to establish communication between said chambers and to thereby prevent axial movements of said shaft in response to admission of fluid into one of said chambers.

19. The apparatus of claim 18, further comprising a second carrier connectable with said spindle in lieu of said first carrier and a second tool on said second carrier, said second carrier having a coupling member connectable with said spindle and a slide movable substantially radially of said coupling member and supporting the second tool, and further comprising means for moving said slide substantially radially of said coupling member in response to rotation of said spindle while said deactivating means is operative to prevent axial movements of said shaft with reference to said housing in response to admission of fluid into one of said chambers.

20. The apparatus of claim 19, wherein said second tool is a turning tool and further comprising means for deactivating said moving means when said piston is free to move in said cylinder in response to admission of fluid into a selected chamber.

* * * * *